Aug. 20, 1929.  J. L. HIPPLE  1,725,397
PLOW HITCH
Filed Oct. 27, 1927
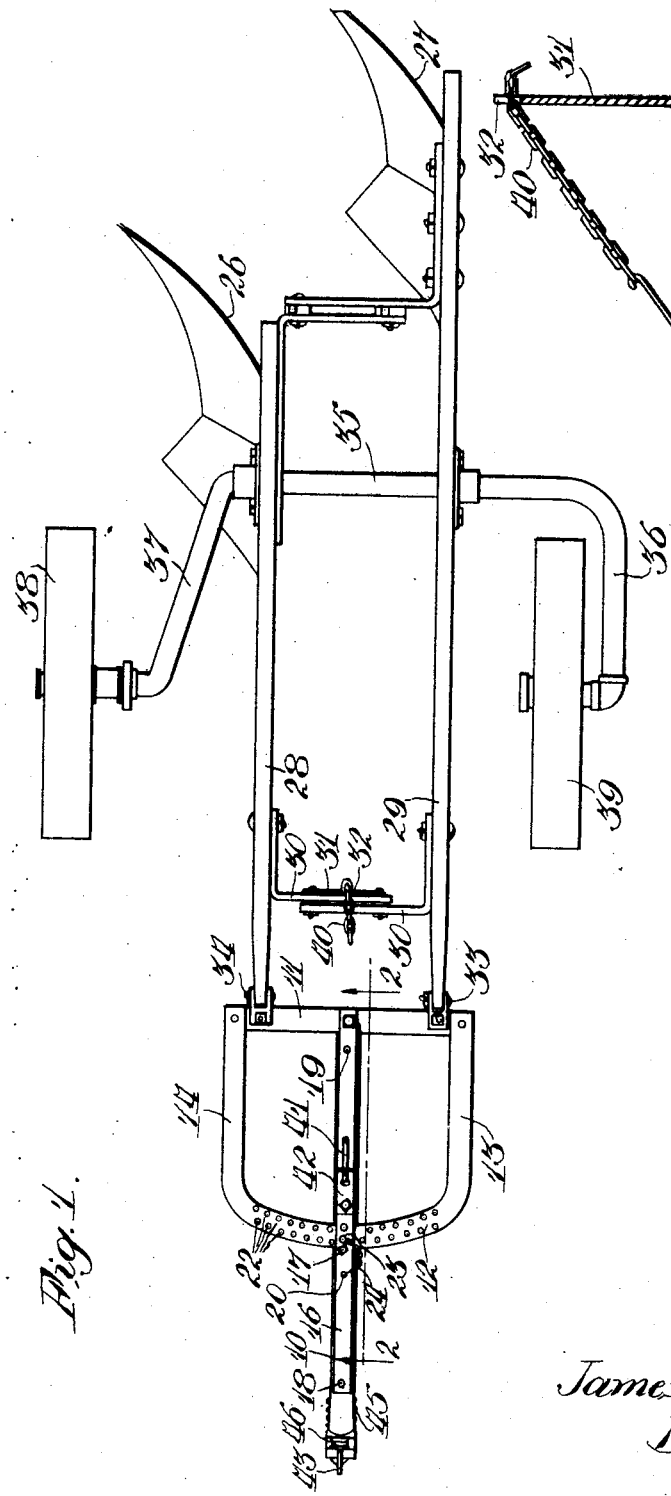
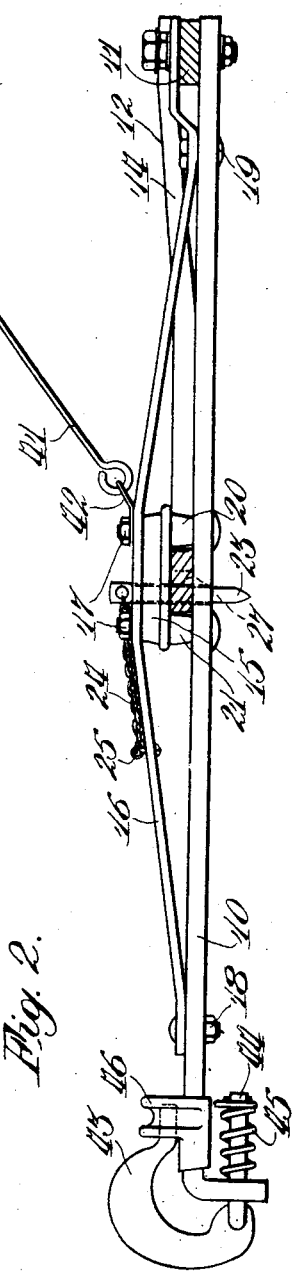
Inventor
James L Hipple
By [signature]
Atty.

Patented Aug. 20, 1929.

1,725,397

UNITED STATES PATENT OFFICE.

JAMES L. HIPPLE, OF CANTON, ILLINOIS, ASSIGNOR TO INTERNATIONAL HARVESTER COMPANY, A CORPORATION OF NEW JERSEY.

PLOW HITCH.

Application filed October 27, 1927. Serial No. 229,031.

This invention relates to draft appliances, and more particularly to draft appliances associated with earth working devices adapted to be pulled behind a tractor.

An object of the invention is to provide a practical and successful draft appliance capable of withstanding the twisting and bending strains involved when an earth working device is pulled behind a tractor in such position that the path of movement of the device is offset with relation to the path of movement of the tractor.

Another object of the invention is to provide a draft appliance for plows which will permit of the operation of the plow along a path of movement having any desired degree of offset with relation to the tractor which is pulling the plow.

Further objects of the invention will appear as the accompanying description proceeds.

An illustrative embodiment of the invention is shown in the accompanying drawings, in which:

Figure 1 is a plan showing the draft appliance associated with a two-bottom wheel plow; and Figure 2 is a side elevation of the draft appliance, looking in the direction of the arrows 2—2 in Figure 1.

The illustrative draft appliance comprises a truss construction having the primary draft member 10 preferably pivotally secured at its rearward end to a support herein shown as an implement supported bar 11. Intermediate its ends the member 10 is adjustable along a front hitch bar 12 herein shown as having the rearwardly extending legs 13 and 14 secured to the bar 11.

Substantially midway of the length of the member 10 is a compression member 15 herein shown interposed between the member 10 and an auxiliary truss member 16. Securing devices, such as the bolts 17, are passed through the members 10, 15 and 16 to rigidly unite them. The auxiliary truss member 16 extends downwardly at each side of the compression member 15 to positions near the ends of the member 10 to which it is rigidly secured at 18 and 19, as shown in the drawings.

The compression member 15 is preferably of U-shaped formation so as to receive the bar 12 between its legs 20 and 21, as shown in Figure 2 of the drawings. To maintain the draft appliance at any desired angle with respect to the path of movement of the attached implement, holes 22 are provided in the bar 12. A pin 23 may be passed through any desired one of these holes and through an aligned opening in the members 10 and 15, to secure the draft appliance in the desired position. The pin 23 is preferably attached to the member 16 by a chain 24 anchored at 25.

The implement herein shown as associated with the draft appliance includes two plow beams 26 and 27 having forwardly extending, parallel beams 28 and 29. These beams are preferably rigidly united near their forward ends by braces 30, to one of which is secured an anchor plate 31 provided with a chain receiving notch 32 illustrated in Figure 2 of the drawings. To the forward ends of the plow beams pivotal connections 33 and 34 are secured. These connections allow the draft appliance to pivot upwardly or downwardly about the forward ends of the plow beams. The plow is shown as supported by an axle 35 having cranks 36, 37, through which are rotatably secured the supporting wheels 38 and 39.

For the purpose of maintaining the plow bottoms and plow beams in elevated position for transport purposes the draft appliance is connected with the anchor plate 31 by devices shown in Figure 2 of the drawings. These devices include a chain 40 and a link 41, the latter being pivotally secured to a member 42 fixed on the draft appliance near its mid-portion. When the plow beams and plow bottoms are elevated, the anchor plate 31 tends to tip backward away from the draft appliance, but, as soon as the slack in the chain 40 is taken up, the pull of the plow bottoms is transferred to the draft appliance, the member 16 of which then becomes a tension member co-operating with the main member 10, which then acts as a compression member.

A spring release hitch is mounted on the draft appliance at its forward end. This includes the pivoted hook 43, the rod 44, the spring 45, and the sleeve 46.

Although the invention has been described in relation to a particular structure, it is to be appreciated that it is not limited thereto, but that it may be used in various combinations and sub-combinations within the scope of the appended claims.

What is claimed as new is:

1. A draft appliance for securing an earth working device behind a tractor and in offset relation thereto comprising, in combination, a support, a main draft member pivoted to the support and extending forwardly therefrom, a compression block secured intermediate the ends of the draft member in spaced relation to one side thereof, a tension bar secured to the outer side of the compression block with its ends extended into contact with the main draft member near its ends and rigidly secured to the draft member at its ends, a transverse bar secured to the support and slidably passing between the compression block and the draft member, means for securing the draft member at any desired angle with respect to said support, and a hitch device mounted at the forward end of the draft member.

2. A combined plow and draft appliance comprising, in combination, rigidly united plow beams, a wheel supported axle journaled transversely of the plow beams, plow bodies carried by the beams rearwardly of the axle, a transverse bar pivotally connected to the forward ends of the plow beams, a second bar secured to the first mentioned bar and having an arcuate transverse portion located forwardly of the first mentioned bar, a forwardly extending draft member pivoted substantially midway of the length of the first mentioned bar and extending underneath the transverse portion of the second bar, a compression block secured substantially midway of the draft member and formed so as to constitute a guideway slidably receiving said transverse portion, a tension bar rigidly secured to the draft member near its ends and rigidly secured to the compression block, an anchor plate secured to the plow beams at a position above the level of the draft member, and a connecting device fastened at one end to the draft member midway of its length and fastened at its other end to the anchor plate.

In testimony whereof I affix my signature.

JAMES L. HIPPLE.